United States Patent
Nakasato

(10) Patent No.: US 9,966,654 B2
(45) Date of Patent: May 8, 2018

(54) FILTER CIRCUIT, COMMUNICATION CIRCUIT EQUIPPED WITH FILTER CIRCUIT, AND NUMERICAL CONTROL EQUIPPED WITH FILTER CIRCUIT

(71) Applicant: FANUC CORPORATION, Yamanashi (JP)

(72) Inventor: Teruki Nakasato, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days. days.

(21) Appl. No.: 15/650,051

(22) Filed: Jul. 14, 2017

(65) Prior Publication Data

US 2018/0034131 A1   Feb. 1, 2018

(30) Foreign Application Priority Data

Jul. 26, 2016   (JP) ................. 2016-146167

(51) Int. Cl.
*H01Q 1/24*   (2006.01)
*H04M 1/60*   (2006.01)
*H04B 5/00*   (2006.01)

(52) U.S. Cl.
CPC ............. *H01Q 1/24* (2013.01); *H04B 5/0031* (2013.01); *H04M 1/6008* (2013.01); *H04M 1/6016* (2013.01)

(58) Field of Classification Search
CPC ...... H01Q 1/24; H04M 1/6016; H04B 5/0031
See application file for complete search history.

(56) References Cited

U.S. PATENT DOCUMENTS

| | | | | |
|---|---|---|---|---|
| 4,569,018 A | * | 2/1986 | Hummel | G06F 9/226 711/207 |
| 5,774,133 A | * | 6/1998 | Neave | G06T 17/00 345/441 |
| 6,334,183 B1 | * | 12/2001 | Blomgren | G06F 9/3824 708/236 |
| 2011/0225475 A1 | * | 9/2011 | Kumar | G06F 11/1052 714/763 |
| 2013/0123578 A1 | * | 5/2013 | Gocho | A61B 1/00006 600/109 |
| 2016/0328239 A1 | * | 11/2016 | Iyer | G06F 9/30112 |

FOREIGN PATENT DOCUMENTS

JP    11-102341    4/1999

* cited by examiner

*Primary Examiner* — Lewis West
(74) *Attorney, Agent, or Firm* — Wenderoth, Lind & Ponack, L.L.P.

(57) ABSTRACT

To provide a filter circuit, a communication circuit including a filter circuit, and a numerical control including a filter circuit, which improve transmission efficiency of partial write performed in a communication circuit made using an all-purpose serial communication protocol. A partial-write enable filter circuit includes: a data input unit that accepts input data; a determination unit that determines whether partial write of input data is valid; an enable information acquisition unit that acquires partial-write enable information; a storage unit that stores partial-write enable information; a computation unit that computes valid data in the input data; and a data output unit that outputs the valid data computed by the computation unit.

5 Claims, 13 Drawing Sheets

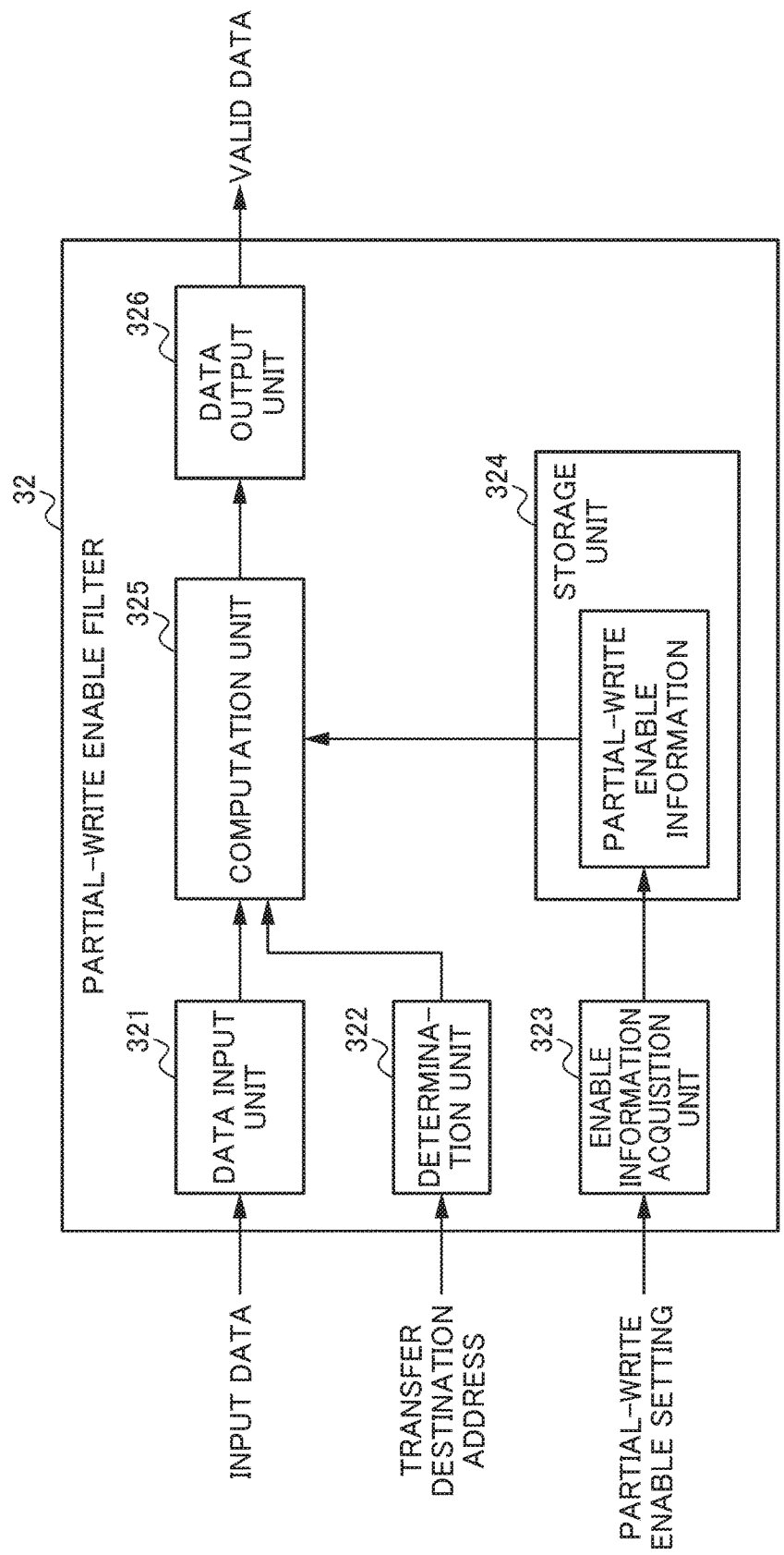

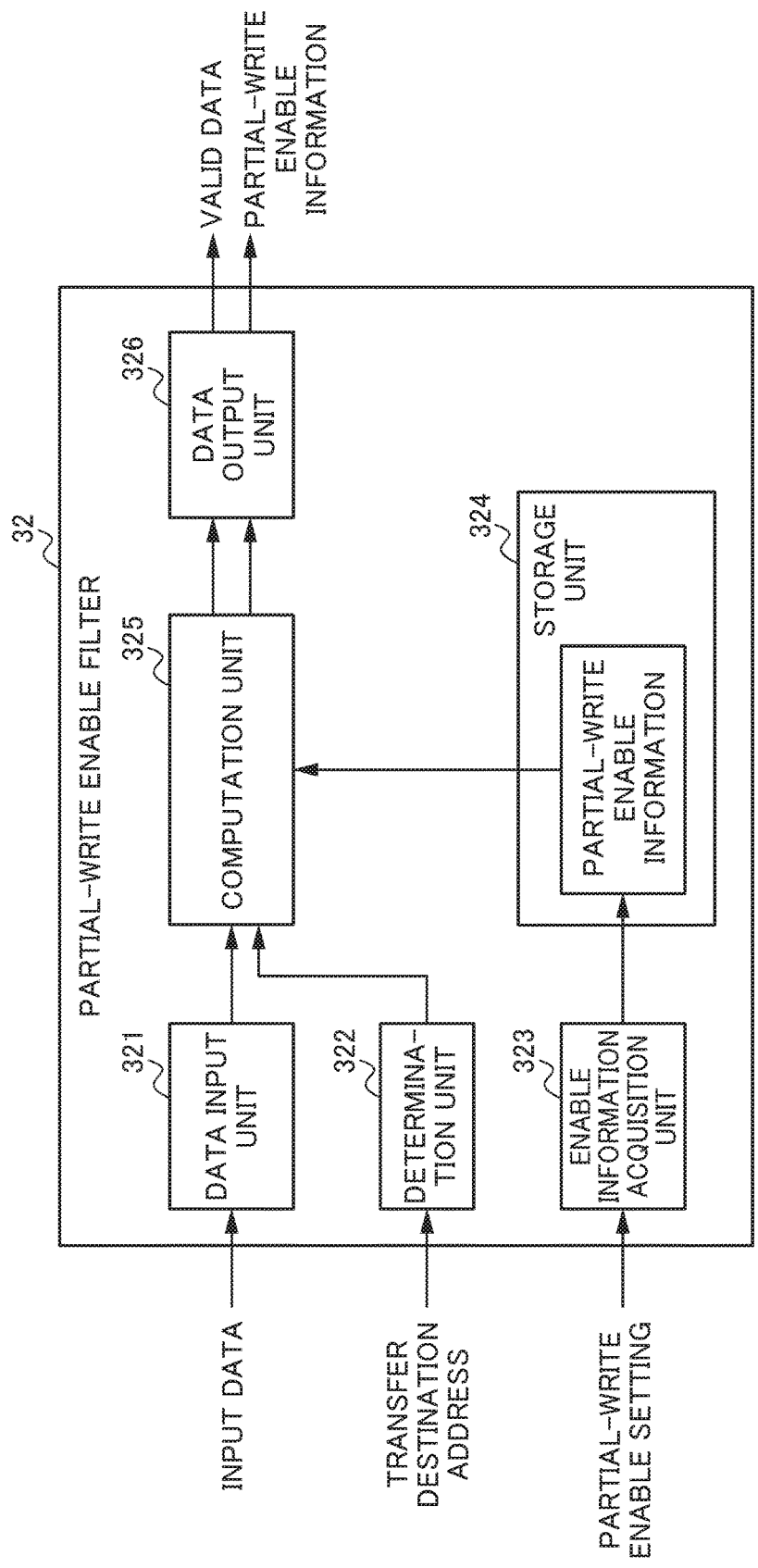

FILTER CIRCUIT, COMMUNICATION CIRCUIT EQUIPPED WITH FILTER CIRCUIT, AND NUMERICAL CONTROL EQUIPPED WITH FILTER CIRCUIT

This application is based on and claims the benefit of priority from Japanese Patent Application No. 2016-146167, filed on 26 Jul. 2016, the content of which is incorporated herein by reference.

BACKGROUND OF THE INVENTION

Field of the Invention

The present invention relates to a filter circuit mounted on a receiver circuit for performing serial communication, a communication circuit equipped with this filter circuit, and a numerical control equipped with this filter circuit.

Related Art

Conventionally, upon transmitting discontinuous data to a receiver circuit from a transmitter circuit via serial communication, technology is known for improving the transmission efficiency.

For example, Patent Document 1 discloses a data transfer system using a partial-write enable function in order to improve transfer efficiency.

Patent Document 1: Japanese Unexamined Patent Application, Publication No. H11-102341

SUMMARY OF THE INVENTION

The data transfer system described in Patent Document 1 retains partial-write enable information within the transmitter circuit, attaches to transmission data within the transmitter circuit and transfers to the receiver circuit, and based on the partial-write enable information attached to the data within the receiver circuit, performs allowance or inhibition of writing for part or all of the data.

Although it is thereby possible to curb the transfer frequency, since it is necessary to keep the partial-write enable information relative to all data within a packet of transmission data, it have not been possible to realize on an all-purpose serial communication protocol such as PCI Express (PCIe).

Therefore, the present invention has an object of providing a filter circuit that improves the transfer efficiency of partial write performed in a communication circuit made using an all-purpose serial communication protocol, a communication circuit equipped with this filter circuit, and a numerical control equipped with this filter circuit.

In a partial-write enable filter circuit (e.g., the partial-write enable filter circuit 32 described later) according to the present invention that permits or inhibits writing for a part or all of input data in a receiver circuit (e.g., the receiver circuit 3 described later) performing serial communication with a transmitter circuit (e.g., the transmitter circuit 2 described later), the filter circuit includes: a data input unit (e.g., the data input unit 321 described later) that accepts the input data; a determination unit (e.g., the determination unit 322 described later) that determines whether partial write of the input data inputted at the data input unit is valid; an enable information acquisition unit (e.g., the enable information acquisition unit 323 described later) that acquires partial-write enable information indicating a valid portion of the input data inputted at the data input unit; a storage unit (e.g., the storage unit 324 described later) that stores the partial-write enable information acquired by the enable information acquisition unit; a computation unit (e.g., the computation unit 325 described later) that computes valid data in the input data, based on the partial-write enable information stored in the storage unit and corresponding to the input data, and the input data inputted at the data input unit, in a case of the determination unit determining that partial write of the input data is valid; and a data output unit (e.g., the data output unit 326 described later) that outputs the valid data computed by the computation unit.

The storage unit may store a plurality of sets of the partial write enable information; the partial-write enable filter circuit further include a selection unit (e.g., the selection unit 327 described later) that selects one set of the partial-write enable information from the plurality of sets of the partial-write enable information stored in the storage unit, based on the input data inputted at the data input unit; and the computation unit may compute the valid data based on the input data inputted at the data input unit and the set of the partial-write enable information selected by the selection unit.

The selection unit may select one set of the partial-write enable information from the plurality of sets of the partial-write enable data stored in the storage unit, based on an input address indicating an address at which data is written in the input data.

A communication circuit (e.g., the communication circuit described later) according to the present invention includes: a transmitter circuit that transmits, to a receiver circuit, input data including transfer destination address information which differs for every set of input data; and the receiver circuit including the filter circuit, and an address translation unit (e.g., the address translation circuit 34 described later) that converts an address for writing the valid data in a storage region (e.g., the storage region 33 described later of the receiver circuit, in which the selection unit of the filter circuit selects one set of the partial-write enable information from among a plurality of sets of the partial-write enable information stored in the storage unit, based on the transfer destination address information of the input data inputted at the data input unit, and in which the address translation unit converts the address of the valid data and stores the valid data at the same address in the storage region of the receiver circuit.

A numerical control (e.g., the numerical control 10 described later) according to the present invention includes the communication circuit.

According to the present invention, it is possible to provide a filter circuit, a communication circuit equipped with the filter circuit, and a numerical control equipped with the filter circuit, which improve the transfer efficiency of partial write performed in a communication circuit made using an all-purpose serial communication protocol.

BRIEF DESCRIPTION OF THE DRAWINGS

FIG. 5A is a block diagram showing a specific configuration of a partial-write enable filter circuit shown in FIG. 4;

FIG. 5B is a block diagram showing another configuration of a partial-write enable filter circuit shown in FIG. 5A;

DETAILED DESCRIPTION OF THE INVENTION

Figure 1:
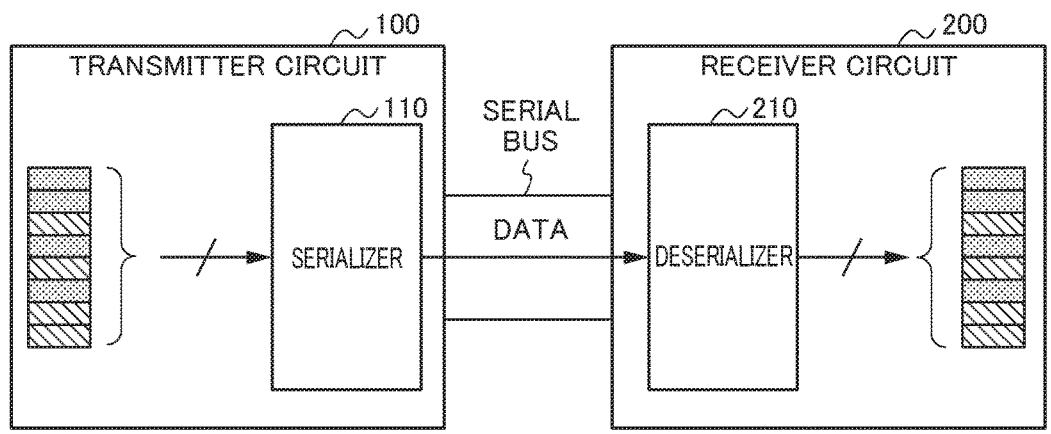
FIG. 1 is a block diagram showing general serial communication.
Figure 2:
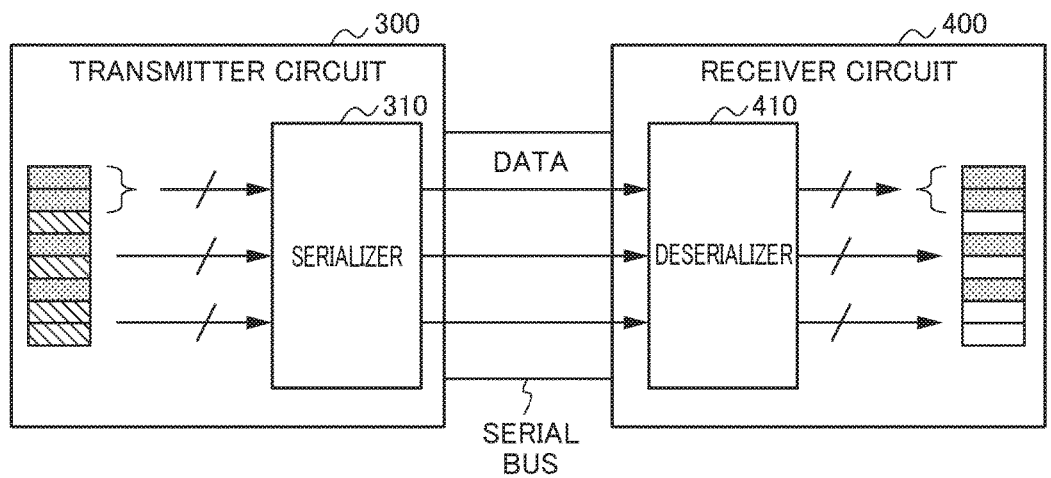
FIG. 2 is a block diagram showing an example of transferring discontinuous data via serial communication in the case of not having a partial-write enable function.
Figure 3:
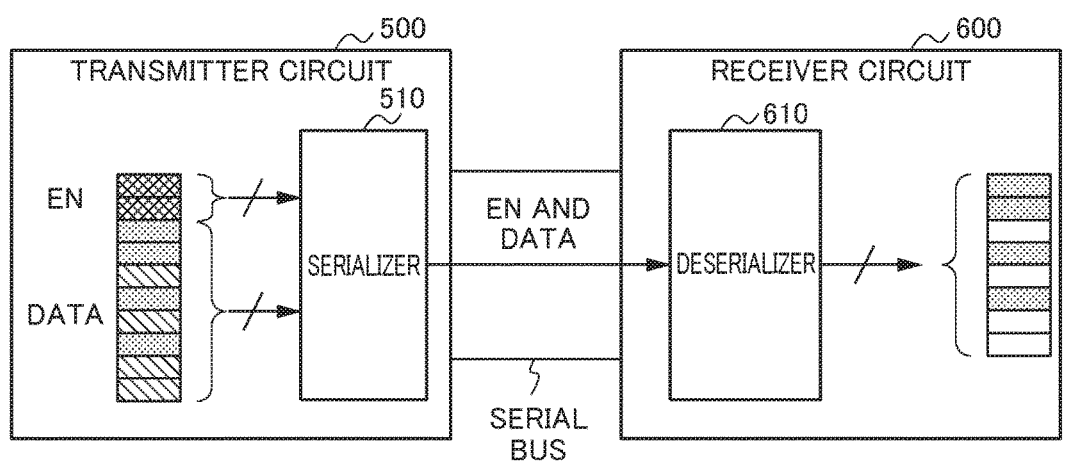
FIG. 3 is a block diagram showing an example of transferring discontinuous data via serial communication in the case of having a partial-write enable function.

Hereinafter, examples of embodiments of the present invention will be explained. FIGS. 1 to 3 are block diagrams showing serial communication between a transmitter circuit and receiver circuit.

FIG. 1 is a block diagram showing general serial communication. In the example shown in FIG. 1, burst transfer via serial communication is shown. On the side of the transfer circuit 100 in FIG. 1, the data to be transferred to the receiver circuit 20 is shown by the meshed pattern, and invalid data is shown by the slanted-line pattern.

The data in the transmitter circuit 100 is transmitted to a serializer 110 through a parallel bus, and is converted to a serial signal by the serializer 110. Then, the converted data arrives at a deserializer 210 within the receiver circuit 200 via the serial bus, is converted to a parallel signal by the deserializer 210, and transmitted to a storage region in the receiver circuit 200.

In such serial communication, since invalid data is transferred along with valid data, it overwrites also in a case of valid data existing at the transfer destination address in the storage region within the receiver circuit 200.

FIG. 2 is a block diagram showing an example of transferring discontinuous data via serial communication in the case of not having a partial-write enable function. On the side of the transmitter circuit 300 in FIG. 2, the data to be transferred to the receiver circuit 400 is shown by a meshed pattern, and the invalid data is shown by the slanted line pattern. In addition, the data not to be transferred to the receiver circuit 400 is shown by a whitewashed pattern.

In the example shown in FIG. 2, since the data to be transferred exists discontinuously, partial write is performed by performing transfer every continuous portion, and performing transfer an equal number of times as the number of continuous portions. However, with such partial write, the data transfer number of times increases compared to the case of FIG. 1. In serial transfer, the transfer delay may increase by the transfer number of times increasing, even if the data volume decreases. For example, in PCI express (PCIe) communication, 16 to 24 bytes of information are attached per transfer. In addition, in cases of systems such that record transfer results for every transfer also, there is a possibility of the transfer number of times to become dominant relative to delay.

FIG. 3 is a block diagram showing an example of transferring discontinuous data via serial communication in a case of having a partial-write enable function. On the side of the transmitter circuit 500 in FIG. 3, the data to be transferred to the receiver circuit 600 is shown by a meshed pattern, and invalid data is shown by a slanted line pattern. In addition, the data not transferred to the receiver circuit 600 is shown by a whitewashed pattern. Furthermore, on the side of the transmitter circuit 500, the partial-write enable information is shown by a different meshed pattern.

In the example of FIG. 3, the partial-write enable information is saved within the transmitter circuit 500, is attached to the transmission data within the transmitter circuit 500, and is transferred to the receiver circuit 600. Then, the receiver circuit 600 performs permission or inhibition of writing for a part or all of the data, based on the partial-write enable information attached to the data within the receiver circuit 600.

In the example shown in FIG. 3, it is thereby possible to curb the data transfer number of times. However, since it is necessary to keep the partial-write enable information relative to all data in the packets of transmission data, it has not been possible to realize on an all-purpose serial communication protocol such as PCIe.

First Embodiment

Figure 4:
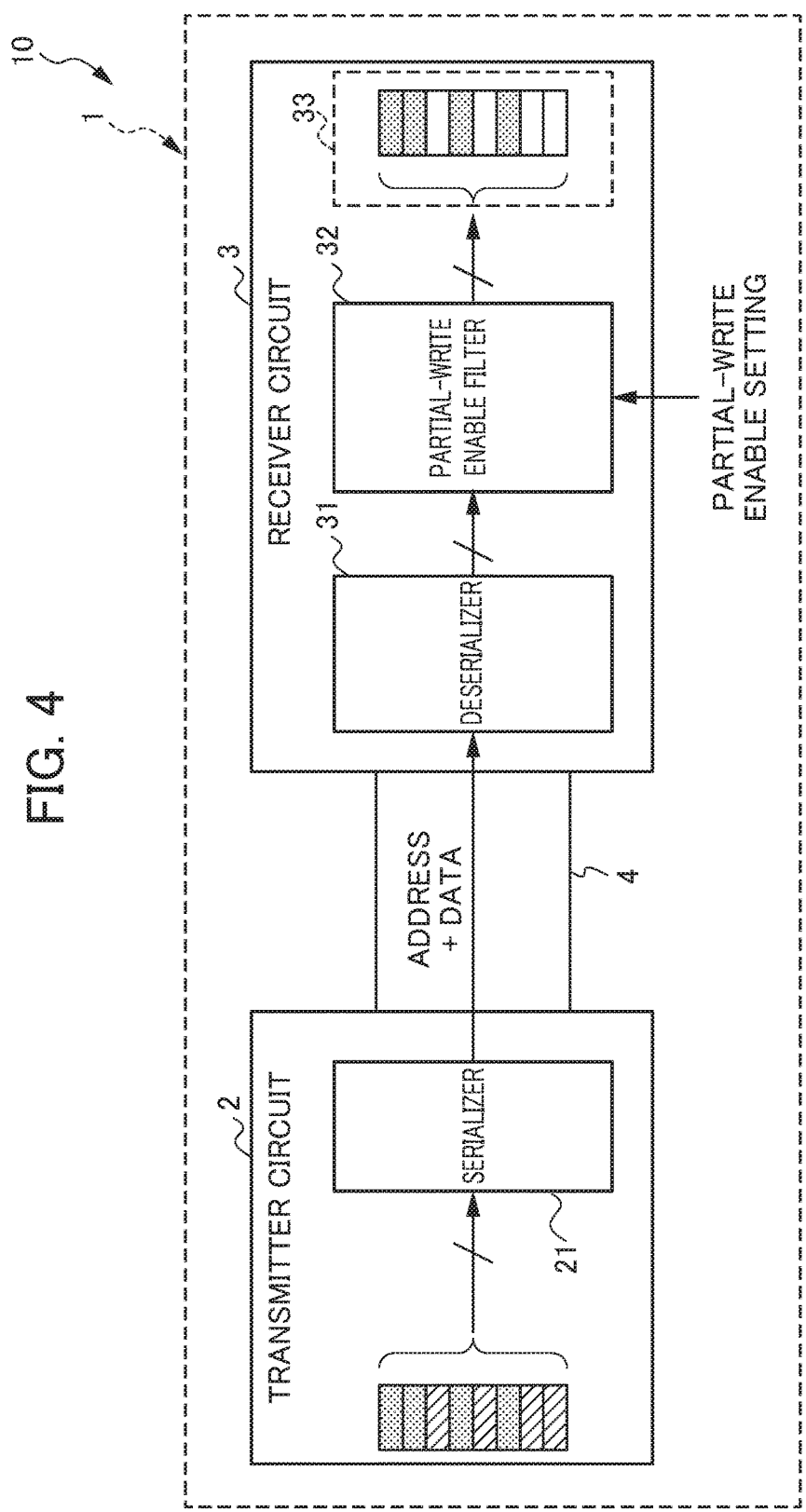
FIG. 4 is a block diagram showing serial communication between a transmitter circuit and receiver circuit in a communication circuit according to a first embodiment.

FIG. 4 is a block diagram showing serial communication between a transmitter circuit 2 and receiver circuit 3 in a communication circuit 1 according to the first embodiment. The communication circuit 1 according to the present embodiment, for example, is provided in a numerical control (Computer Numerical Control: CNC) 10, and transmits/receives data via serial communication.

As shown in FIG. 4, the communication circuit 1 includes the transmitter circuit 2 and receiver circuit 3. The transmitter circuit 2 and receiver circuit 3 are connected by a serial bus 4, and are capable of performing serial communication. The transmitter circuit 2 includes a serializer 21, and transmits data to the receiver circuit 3 through the serializer 21.

As shown in FIG. 4, the data to be transmitted to the receiver circuit 3 from the transmitter circuit 2 is shown by a meshed pattern, and invalid data is shown by a slanted line pattern. In addition, the data saved in advanced in a storage region 33 of the receiver circuit 3 is shown by a whitewashed pattern.

The serializer 21 serializes (converts to a serial signal) the data transmitted through a parallel bus (not illustrated) within the receiver circuit 3 (parallel data). The serializer 21, for example, uses a circuit conforming to general-purpose standards.

The receiver circuit 3 includes a deserializer 31, partial-write enable filter circuit 32, and storage region 33. The deserializer 31 deserializes the data transmitted from the transmitter circuit 2 (serial data). The deserializer 31, for example, uses a circuit conforming to general-purpose standards.

The partial-write enable filter circuit 32 is a circuit for permitting or inhibiting writing for a part or all of the input data inputted from the deserializer 31.

It should be noted that the partial-write enable filter circuit 32 may perform permission or inhibition in 1-byte units called byte enable, or may perform permission or inhibition in units other than 1-byte units or 1-word units, or the like, in the case of permitting or inhibiting writing of a part of the data.

The storage region 33 stores data processed by the partial-write enable filter circuit 32.

FIG. 5A is a block diagram showing a specific configuration of the partial-write enable filter circuit 32 shown in FIG. 4.

As shown in FIG. 5A, the partial-write enable filter circuit 32 includes a data input unit 321, determination unit 322, enable information acquisition unit 323, storage unit 324, computation unit 325, and data output unit 326.

The data input unit 321 accepts input data deserialized by the deserializer 31. In addition, the data input unit 321 determines whether or not partial-write enable information indicating a valid portion of input data is being inputted. The determination unit 322 determines whether or not the partial write of the input data inputted at the data input unit 321 is valid.

More specifically, the determination unit 322 determines whether or not the partial write is valid in a specific address range of input data, based on the transfer destination address of input data. In addition, the determination unit 322 may determine based on a separate standard using a counter, timer, setting register, etc., or may always determine partial write as valid.

The enable information acquisition unit 323 acquires partial-write enable information indicating the valid portion of input data inputted at the data input unit 321. The partial-write enable information, for example, is inputted from outside by a user using an input device of the numerical control 10 or the like.

The storage unit 324 stores partial-write enable information acquired by the enable information acquisition unit 323.

The computation unit 325 computes valid data in the input data, based on the partial-write enable information stored in the storage unit 32 corresponding to the input data, and input data inputted at the data input unit 321, in the case of the determination unit 322 determining that the partial write of input data is valid.

More specifically, the computation unit 325 computes valid data in the input data based on the partial-write enable information and input data, and attaches the partial-write enable information corresponding to the input data to the input data, in the case of the determination unit 322 determining that partial write is valid.

In addition, the computation unit may compute the valid data in the input data based on the partial-write enable information and input data, and separately output the partial-write enable information and the input data as the valid data, without attaching the partial-write enable information corresponding to the input data to the input data.

In addition, in the case of the determination unit 322 determining that the partial write is invalid, the computation unit 325 attaches partial-write enable information with all of the input data set as valid to the input data.

The data output unit 326 outputs valid data computed by the computation unit 325.

FIG. 5B is a block diagram showing another configuration of the partial-write enable filter circuit 32 shown in FIG. 5A. In the example shown in FIG. 5B, contrary to the partial-write enable filter circuit 32 shown in FIG. 5A, the computation unit 325 does not attach the partial-write enable information stored in the storage unit 324 and corresponding to input data to the input data inputted at the data input unit 321, and separately outputs the partial-write enable information and input data as valid data.

Figure 6:
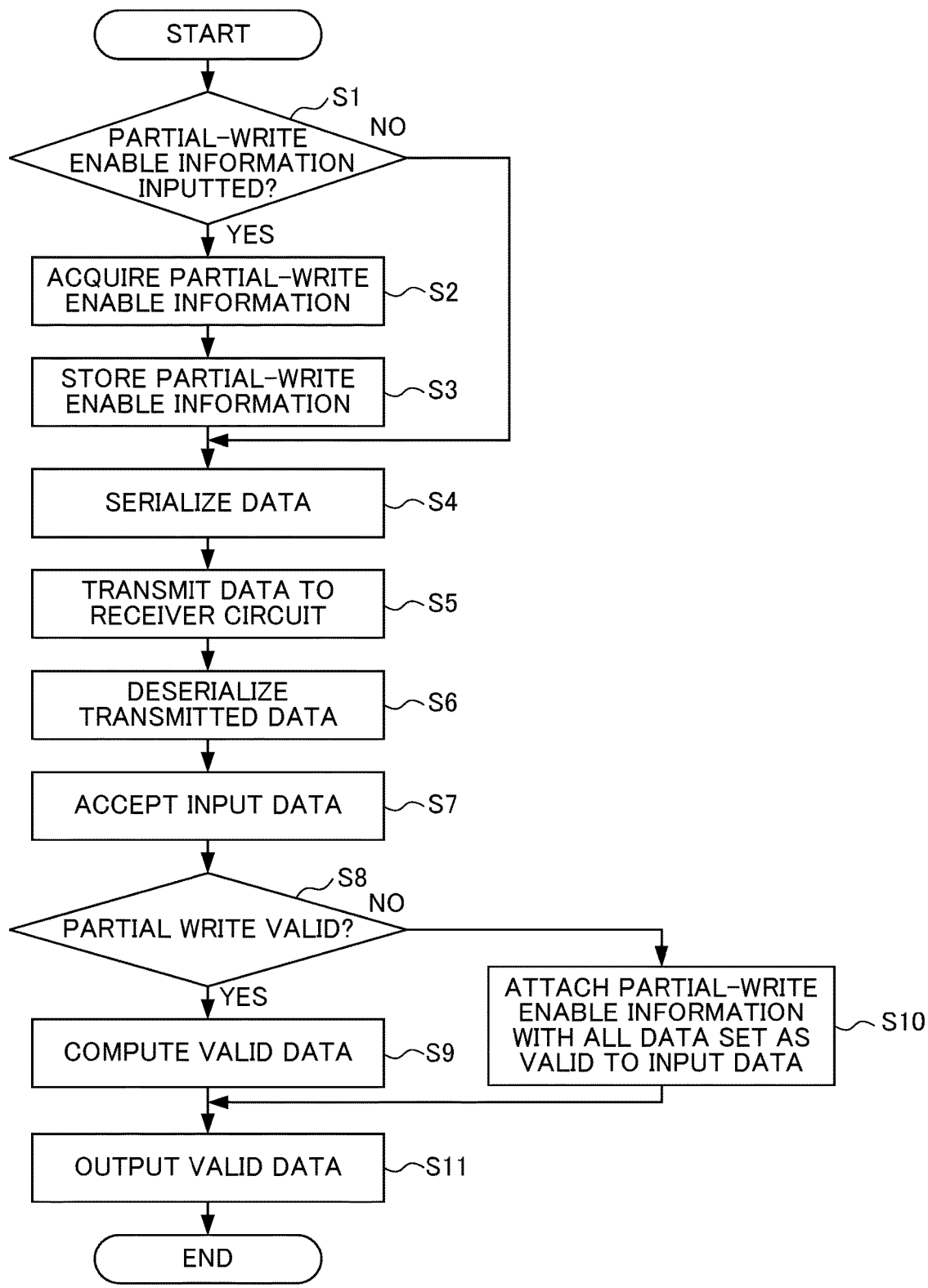
FIG. 6 is a flowchart illustrating the flow of data transfer processing in the communication circuit according to the first embodiment.

FIG. 6 is a flowchart illustrating the flow of data transfer processing in the communication circuit 1 according to the first embodiment.

In Step S1, the data input unit 321 determines whether or not the partial-write enable information indicating a valid portion of input data is being inputted. In the case of the partial-write enable information being inputted (YES), the processing advances to Step S2. In the case of the partial-write enable information not being inputted (NO), the processing advances to Step S4. If having once stored the enable information in this way, the receiver circuit 3 will use the enable information already stored unless there is a change.

In Step S2, the enable information acquisition unit 323 acquires partial-write enable information indicating the valid portion of input data inputted at the data input unit 321. The partial-write enable information, for example, is inputted from outside by the user using an input device of the numerical control 10 or the like.

In Step S3, the storage unit 324 stores the partial-write enable information acquired by the enable information acquisition unit 323.

In Step S4, the serializer 21 of the transmitter circuit 2 serializes (converts into a serial signal) the data transmitted through the parallel bus (not illustrated) of the transmitter circuit 2 (parallel data).

In Step S5, the transmitter circuit 2 transmits the data serialized by the serializer 21 to the receiver circuit 3.

In Step S6, the deserializer 31 deserializes (converts to a parallel signal) the data transmitted from the transmitter circuit 2 (serial data). In Step S7, the data input unit 321 accepts input data deserialized by the deserializer 31.

In Step S8, the determination unit 322 determines whether or not the partial write of input data inputted at the data input unit 321 is valid. In the case of being determined that the partial write is valid (YES), the processing advances to Step S9. In the case of being determined that the partial write is invalid (NO), the processing advances to Step S10.

In Step S9, the computation unit 325 computes valid data in the input data, based on the partial-write enable information stored in the storage unit 324 and corresponding to the input data, and the input data inputted at the data input unit 321.

In Step S10, the computation unit 325 attaches partial-write enable information with all of the data set as valid to the input data. Subsequently, the processing advances to Step S11.

In Step S11, the data output unit 326 outputs the valid data computed by the computation unit 325, and ends the processing.

Figure 7:
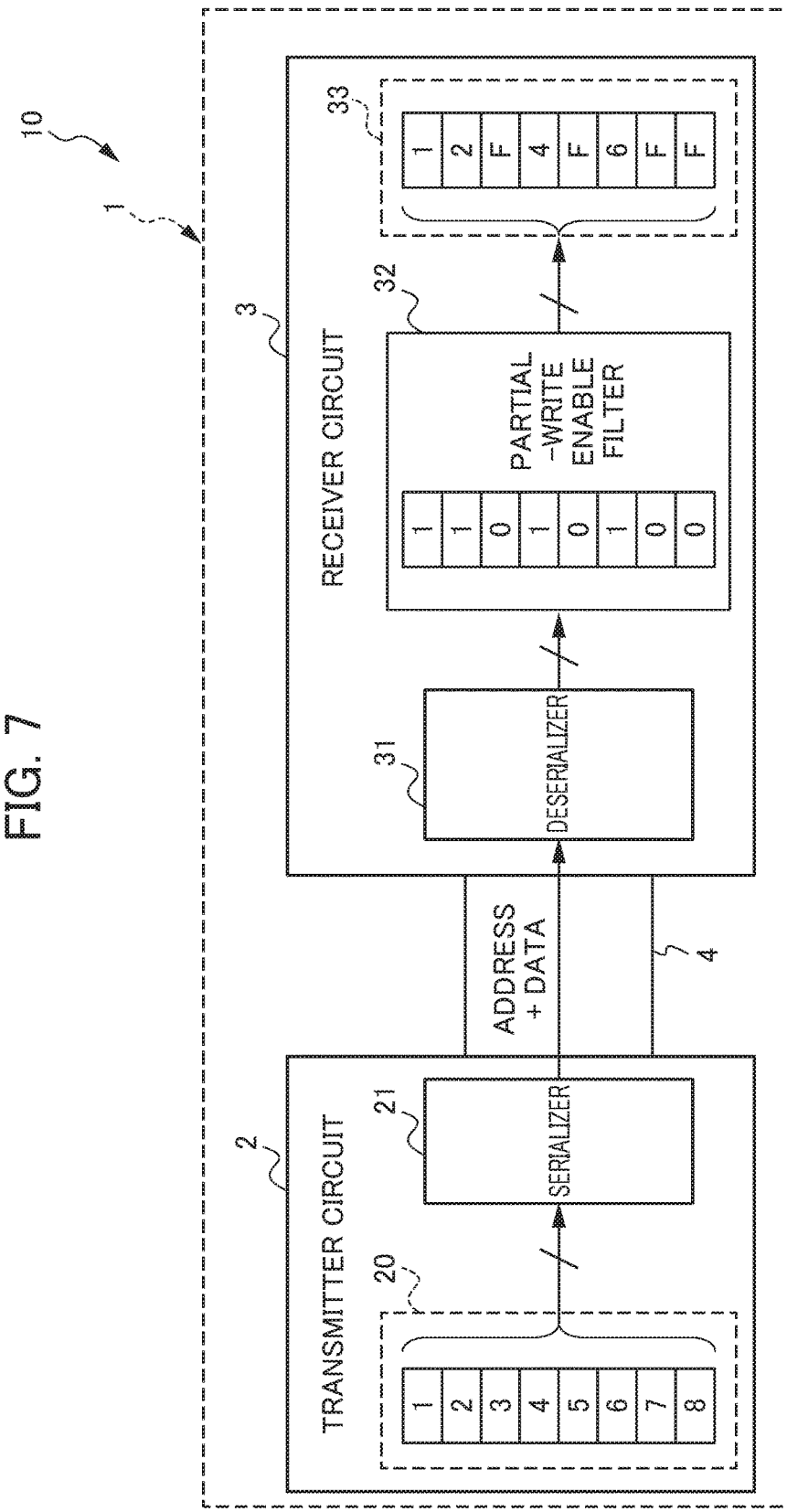
FIG. 7 is an example showing specific values for the transmitter circuit and receiver circuit shown in FIG. 4.

FIG. 7 is an example of a case of giving a specific value to the transmitter circuit 2 and receiver circuit 3 shown in FIG. 4. As shown in FIG. 7, for example, the setting for permission or inhibition of writing is assumed possible for 4 bytes of data per 1 byte of partial-write enable filter circuit 32. Then, the transmitter circuit 2 transmits data 0×12345678 to the address 0×00, the storage region of the receiver circuit 3 saves the data 0×FFFFFFFF at the address 0×00, and the partial-write enable filter circuit 32 is assumed to have 0b11010100 as the partial-write enable information.

In this case, first, the parallel data 0x12345678 within the transmitter circuit 2 is serialized, and transmitted to the receiver circuit 3 as serial data. Next, the data transmitted from the receiver circuit 2 is deserialized by the deserializer 31 of the receiver circuit 3, and converted into parallel data.

The partial-write enable filter circuit 32 attaches the partial-write enable information 0b11010100 to the parallel data. As a result thereof, the data 0x12F4F6FF is stored at the address 0x00 within the storage region of the receiver circuit 3.

According to the aforementioned first embodiment, the partial-write enable filter circuit 32 provides a storage unit 324 which stores in advance the partial-write enable information indicating the valid portion of data, and when corresponding data is inputted, is configured to output the valid data and the partial-write enable information. The partial-write enable filter circuit 32 can thereby improve the transfer efficiency of partial write occurring in the communication circuit 1 made using an all-purpose serial communication protocol such as PCIe.

For example, in the example shown in FIG. 7, assuming a case of not performing partial write, it is necessary to transfer data by dividing into four times, and in the case of the delay per one transfer is large and serial transfer with a small difference in delay due to transfer length, the delay becomes greater. In addition, in the case of performing transfer by adding byte enable information to the data within the transmitter circuit 2, it is necessary to include a means for adding the byte enable information to the data within the transmitter circuit 2, and it is not possible to perform partial write by communication made using a general transmitter circuit.

On the other hand, the communication circuit 1 according to the first embodiment can improve the transfer efficiency of partial write by including the partial-write enable filter circuit 32. In addition, in the communication circuit 1 according to the first embodiment, the partial-write enable filter circuit 32 exists only in the receiver circuit 3, and the transmitter circuit 2 can use a general circuit.

Second Embodiment

Next, a second embodiment according to the present invention will be explained. It should be noted that, in the explanation of the second embodiment, the same reference symbols will be attached to constituent elements that are identical to the first embodiment, and explanations thereof will be omitted or simplified. The partial-write enable filter circuit 32 of the second embodiment mainly differs from the first embodiment in the point of including a selection unit 327, and other configurations have similar configurations as the first embodiment shown in FIG. 5A.

Figure 8:
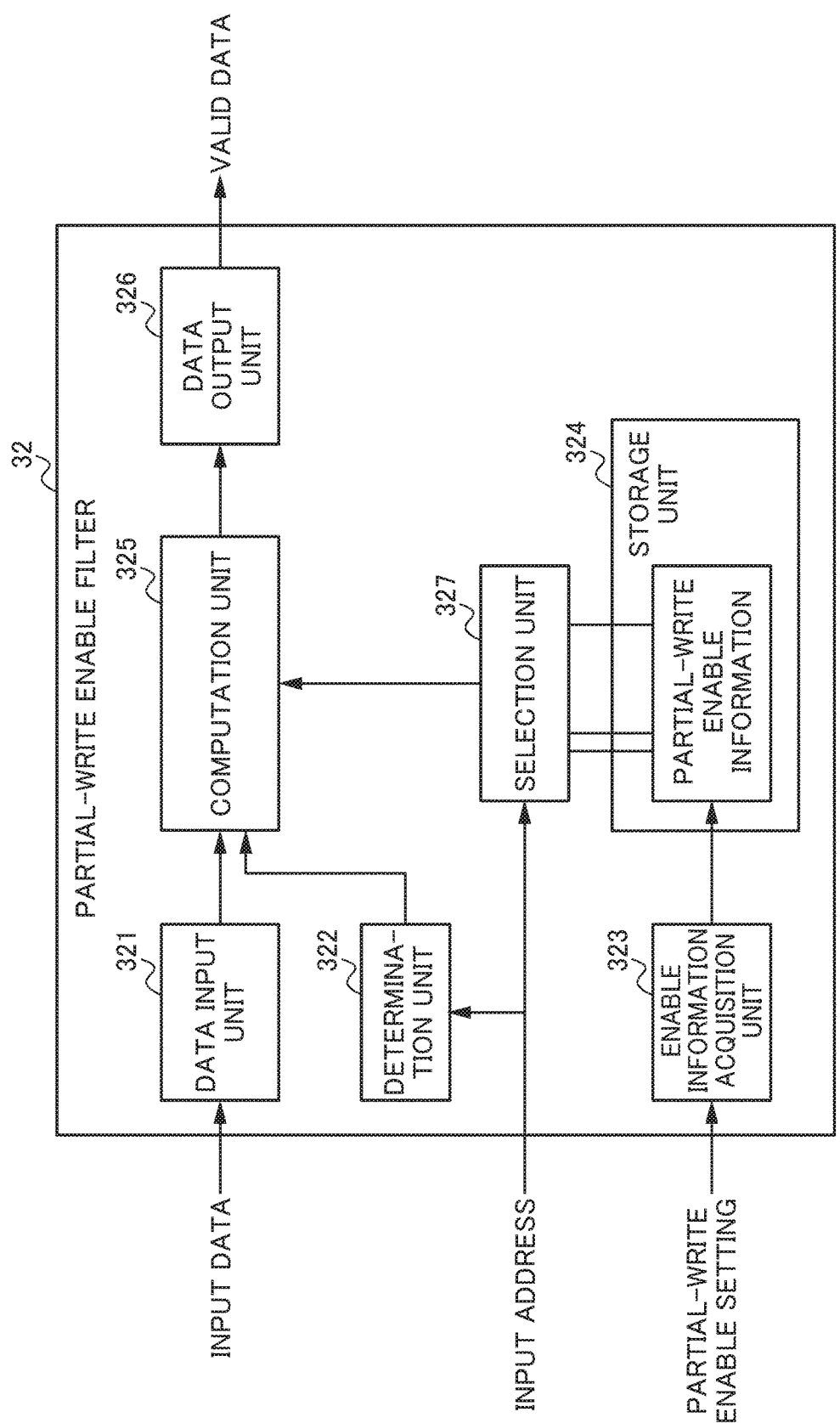
FIG. 8 is a block diagram showing a partial-write enable filter circuit according to a second embodiment.

FIG. 8 is a block diagram showing a partial-write enable filter circuit 32 according to the second embodiment. As shown in FIG. 8, the partial-write enable filter circuit 32 includes a data input unit 321, determination unit 322, enable information acquisition unit 323, storage unit 324, computation unit 325, data output unit 326, and selection unit 327. It should be noted that the data input unit 321, determination unit 322, enable information acquisition unit 323 and data output unit 326 are functions similar to the first embodiment, and thus explanations are omitted.

In the second embodiment, the storage unit 324 enables rewriting of partial-write enable information by way of an external device, for example, and stores a plurality of partial-write enable information. The selection unit 327 selects one set of partial-write enable information from the plurality of sets of partial-write enable information stored in the storage unit 324, based on the input data inputted at the data input unit 321.

More specifically, the selection unit 327 selects one set of partial-write enable information from the plurality of sets of partial-write enable information stored in the storage unit 324, based on the input address indicating the address at which data is written in the input data.

The computation unit 325 computes valid data based on the data inputted at the data input unit 321, and partial-write enable information selected by the selection unit 327.

It should be noted that, as the method of selecting the partial-write enable information to be applied from the plurality of sets of partial-write enable information by the selection unit 327, a method other than the aforementioned selecting based on input address may be used.

For example, in the case of the input data being a protocol of PCI express format, the selection unit 327 recognizes the transmission source of input data based on header information included in the packet of this protocol. Then, the selection unit 327 may select the partial-write enable information based on the recognized transmission source of input data.

In addition, in the case of a data transfer sequence being given a rule in advance, a counter may be provided within the receiver circuit 3. This counter is incremented every time receiving input data. Then, the selection unit 327 may select the partial-write enable information based on the output of the counter.

Figure 9:
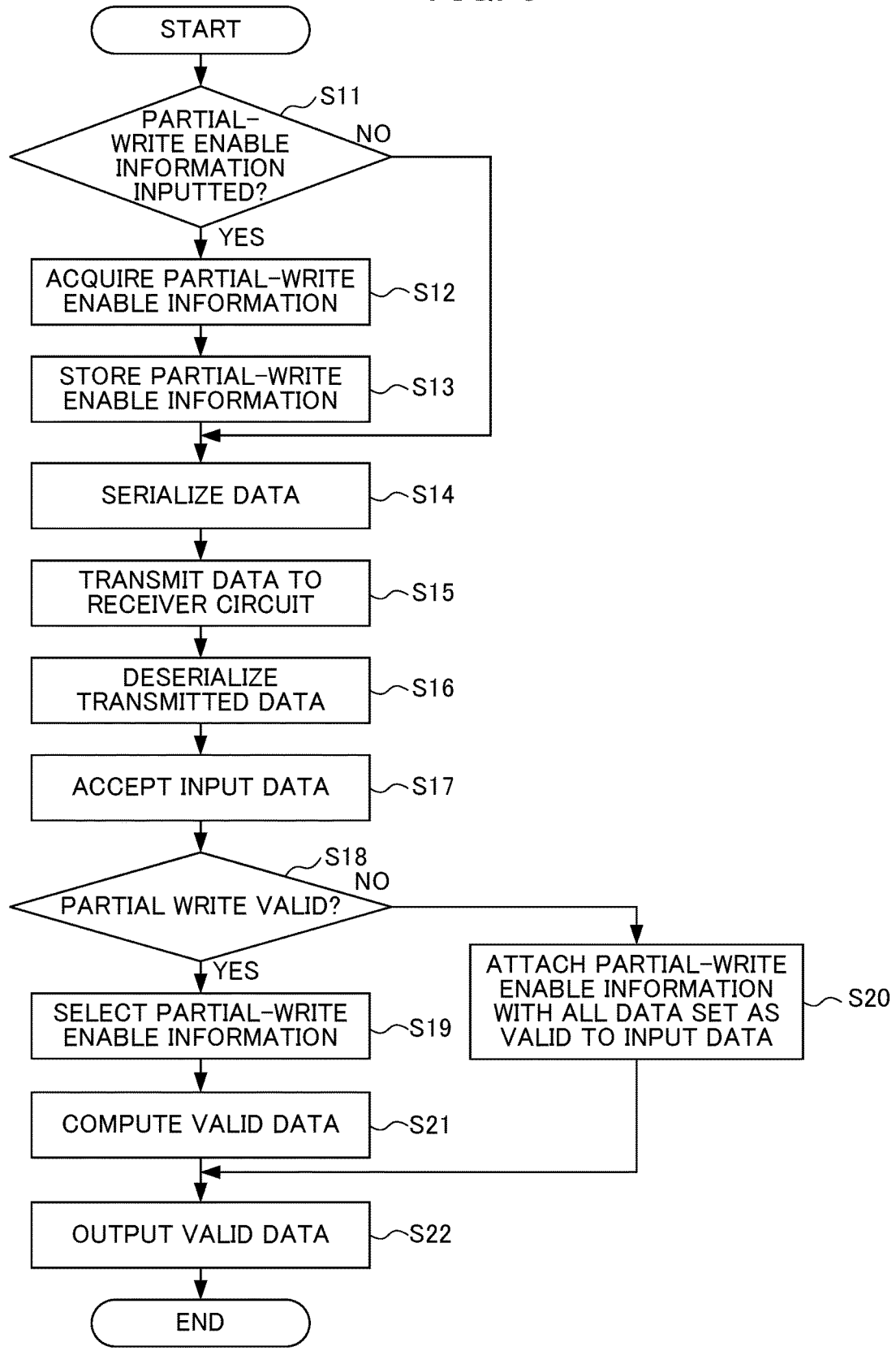
FIG. 9 is a flowchart illustrating the flow of data transfer processing in the communication circuit according to the second embodiment.

FIG. 9 is a flowchart illustrating the flow of data transfer processing in the communication circuit 1 according to the second embodiment. It should be noted that the processing of Steps S11 to S18, S20 and S22 is processing that is similar to the processing of Steps S1 to S8, S10 and S11, respectively, and thus explanations will be omitted. In Step S19, the selection unit 327 selects one set of partial-write enable information from the plurality of sets of partial-write enable information stored in the storage unit 324, based on the input address indicating the address at which data was written in the input data inputted at the data input unit 321. In Step S21, the computation unit 325 computes valid data, based on the data inputted at the data input unit 321, and the partial-write enable information selected by the selection unit 327.

According to the aforementioned second embodiment, the selection unit 327 selects one set of partial-write enable information from the plurality of sets of partial-write enable information. The partial-write enable filter circuit 32 can thereby perform partial write using the appropriate partial-write enable information to be applied.

In addition, the selection unit 327 selects one set of partial-write enable information from the plurality of sets of partial-write enable information, based on the input address indicating the address at which data was written in the input data. The partial-write enable filter circuit 32 can thereby select the appropriate partial-write enable information to be applied.

Third Embodiment

Figure 10:
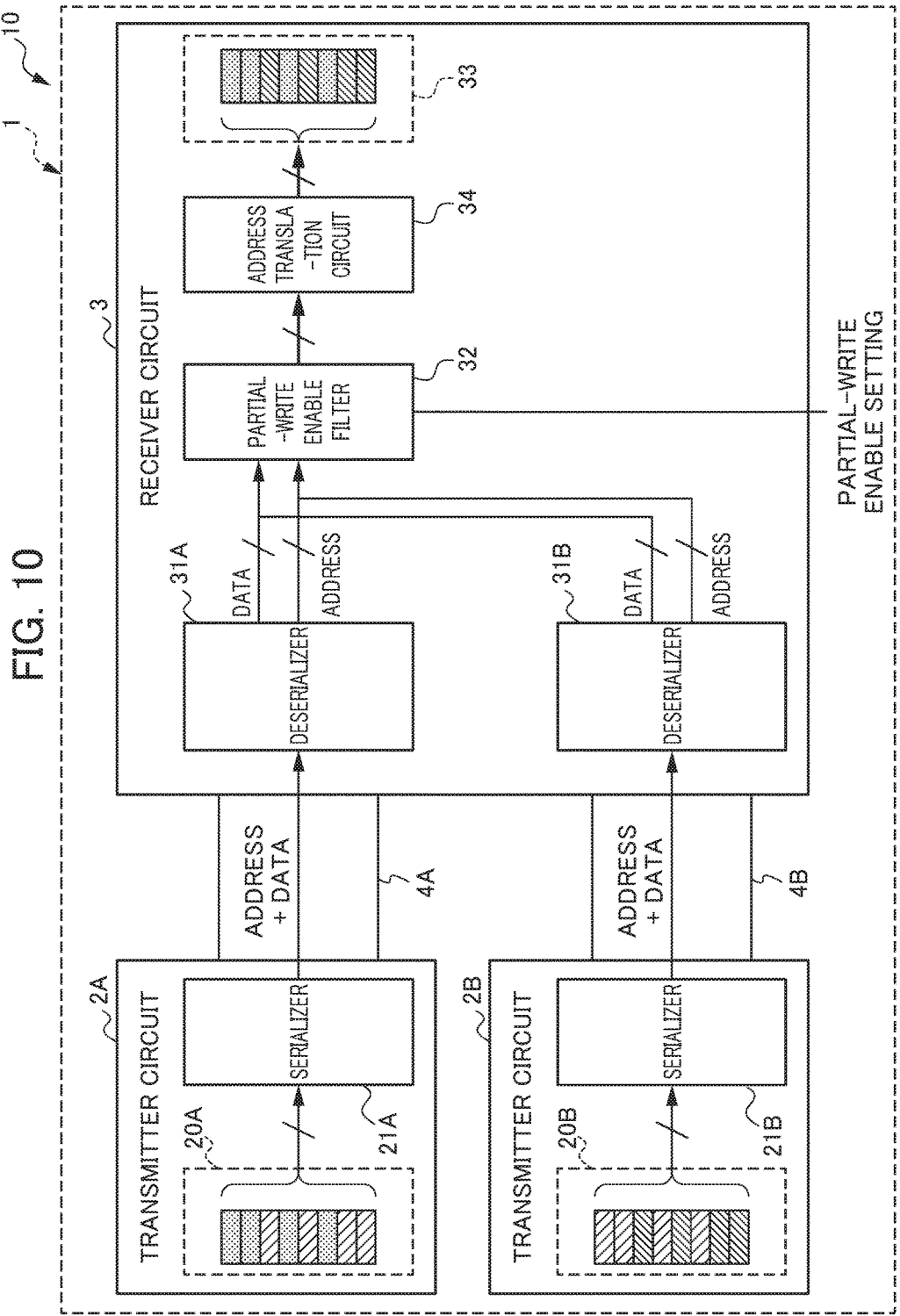
FIG. 10 is a block diagram showing an example of a communication circuit 1 made using the partial-write enable filter circuit shown in FIG. 8.

Next, a third embodiment according to the present invention will be explained. FIG. 10 is a block diagram showing an example of a communication circuit 1 made using the partial-write enable filter circuit 32 shown in FIG. 8.

The communication circuit 1 shown in FIG. 10 differs from the communication circuit 1 shown in FIG. 4, in the point of including transmitter circuits 2A and 2B which respectively have serializers 21A and 21B; deserializers 31A and 31B; as well as an address translation circuit 34. In addition, the data to be transmitted from the transmitter circuit 2 to the receiver circuit 3 is indicated by the downward-left slanted line pattern down to the left, and the invalid data is indicated by the downward-right slanted line pattern.

The transmitter circuits 2A and 2B respectively include serializers 21A and 21B. The transmitter circuits 2A and 2B transmit input data, including transfer destination address information which differs for every input data, to the receiver circuit 3.

The serializers 21A and 21B each serialize different input data transmitted to the receiver circuit 3. The deserializers 31A and 31B each deserialize the input data serialized by the serializers 21A and 21B.

The selection unit 327 of the partial-write enable filter circuit 32 selects one set of partial-write enable information from the plurality of sets of partial-write enable information stored in the storage unit 324, based on the transfer destination address information of input data inputted at the data input unit 321.

The address translation circuit 34 converts the address for writing valid data outputted by the data output unit 326 of the partial-write enable filter circuit 32 into the storage region 33 of the receiver circuit 3.

More specifically, the address translation circuit 34 converts the address of a plurality of different valid data, after the partial-write enable information was added to the plurality of different valid data by the partial-write enable filter circuit 32. Then, the address translation circuit 34 stores the plurality of valid data for which the address was converted at the same address within the storage region 33 of the receiver circuit 3.

Figure 11:
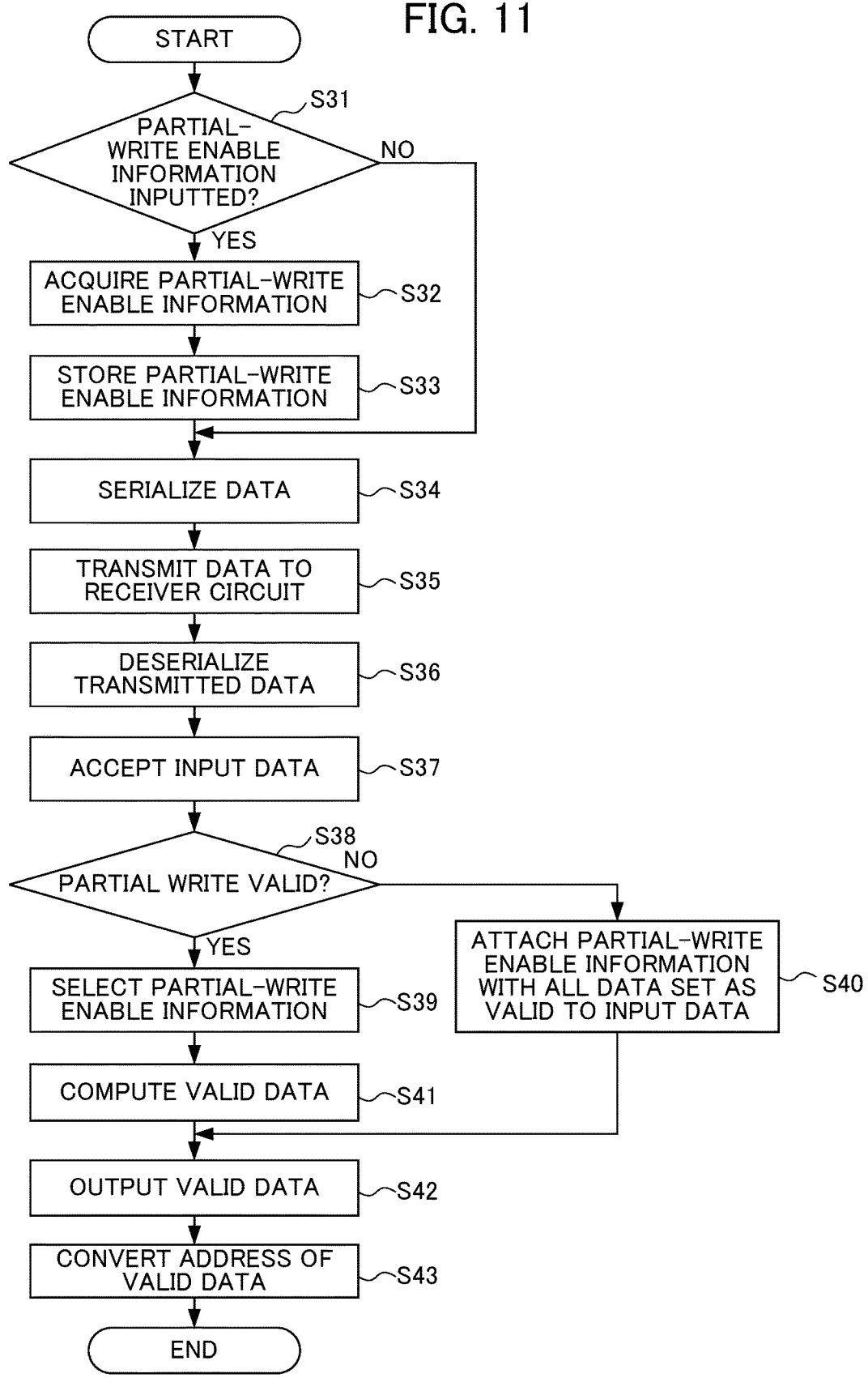
FIG. 11 is a flowchart illustrating the flow of data transfer processing in a communication circuit 1 according to a third embodiment.

FIG. 11 is a flowchart illustrating the flow of data transfer processing in the communication circuit 1 according to the third embodiment.

In Step S31, the data input unit 321 determines whether or not partial-write enable information indicating the valid portion of input data is being inputted. In the case of partial-write enable information being inputted (YES), the processing advances to Step S32. In the case of partial-write enable information not being inputted (NO), the processing advances to Step S34. If having once stored the enable information in this way, the receiver circuit 3 will use the enable information already stored unless there is a change.

In Step S32, the enable information acquisition unit 323 acquires partial-write enable information indicating the valid portion of input data inputted at the data input unit 321. In Step S33, the storage unit 324 stores the partial-write enable information acquired by the enable information acquisition unit 323.

In Step S34, the serializer 21A of the transmitter circuit 2A serializes the data transmitted through the parallel bus (not illustrated) within the transmitter circuit 2A. In addition, the serializer 21B of the transmitter circuit 2B serializes the data transmitted through the parallel bus (not illustrated) within the receiver circuit 3.

In Step S35, the transmitter 2A adds transfer destination address information to the data serialized by the serializer 21A, and transmits to the receiver circuit 3. The transmitter circuit 2B adds the transfer destination address information to the data serialized by the serializer 21B, and transmits to the receiver circuit 3.

In Step S36, the deserializers 31A and 31B deserialize the data transmitted from the transmitter circuits 2A and 2B. In Step S37, the data input unit 321 accepts input data deserialized by the deserializers 31A and 31B.

In Step S38, the determination unit 322 determines whether or not the partial write of input data inputted at the data input unit 321 is valid. In the case of being determined that the partial write is valid (YES), the processing advances to Step S39. In the case of being determined that the partial write is invalid (NO), the processing advances to Step S40.

In Step S39, the selection unit 327 selects one set of partial-write enable information from the plurality of sets of partial-write enable information stored in the storage unit 324, based on the transfer destination address information of the input data inputted at the data input unit 321.

In Step S40, the computation unit 325 adds the partial-write enable information with all of the data set as valid to the input data. Subsequently, the processing advances to Step S42.

In Step S41, the computation unit 325 computes valid data in the input data, based on the partial-write enable information stored in the storage unit 324 and corresponding to the input data, and input data inputted at the data input unit 321. Then, the computation unit 325 adds the partial-write enable information selected in Step S40 to a plurality of different valid data.

In Step S42, the data output unit 326 outputs the valid data computed by the computation unit 325. In Step S43, the address translation circuit 34 converts the addresses of the plurality of different valid data. Then, the address translation circuit 34 stores the plurality of valid data for which the addresses were converted at the same address within the storage region 33 of the receiver circuit 3, and ends the processing.

According to the third embodiment, the communication circuit 1, after adding different partial-write enable information to data having different address information, stores at the same address within the storage region 33 by way of the address translation circuit 34. The communication circuit 1 thereby enables collection of a plurality of sets of data into one, i.e. packing of data. Then, by packing data, it becomes possible to reduce the storage volume and bulk transfer data, in the case of further transferring received data to another location.

It should be noted that, although packing of data transmitted from the different transmitter circuits 2A and 2B is performed in FIG. 10, the data may be transmitted to different addresses from the same transmitter circuit, and different partial-write enable information may be added. It thereby becomes possible to perform packing of data similarly to the example of FIG. 10.

In addition, for partial-write enable information inputted to the enable information acquisition unit 323 of the partial-write enable filter circuit 32, not only a method of determining based on information inputted from outside by the user using an input device or the like such as mentioned above, but another method may be used.

The following such processing is performed, for example, in the case of determining the partial-write enable information based on information inputted by the user. It should be noted that a case of applying the communication circuit 1 to the numerical control 10 controlling a machine tool is explained in the following example.

In the numerical control 10 controlling a machine tool, it is assumed that the below prerequisites are satisfied.
(1) It is assumed that a plurality of transmitter circuits 2 are digital signal processors (DSP), the receiver circuit 3 is a control LSI, and the communication protocol for serial data communication is PCI express.

(2) The machine tool controlled by the numerical control 10 has a plurality of axes as control targets, and all axes have a different axis number.
(3) The transmitter circuit 2 and receiver circuit 3 include a storage region having offset corresponding to the axis number.
(4) The data of a rotation amount of all axes from the numerical control 10 is received by all of the transmitter circuits 2 (DSP).
(5) Each of the transmitter circuits 2 manages a part of the axes without overlapped between transfer circuits 2.
(6) Each of the transmitter circuits 2 performs computation for only the data of an axis managed by the respective transmitter circuit 2 itself, among the data received from the numerical control 10.
(7) Each of the transmitter circuits 2 stores computation results for the data of the axis in a storage region corresponding to the axis number, and transmits the computation results to the receiver circuit 3.
(8) Information of which access is managed by the respective transmitter circuits 2 is inputted as a parameter from an input device of the numerical control 10 by the user, during machining stop of the machine tool (usually, prior to machining start).

In the example satisfying the above prerequisites, in the data from a certain transmitter circuit 2 to the receiver circuit 3, it is sufficient so long as writing is valid only for a data portion of an axis managed by the transmitter circuit 2, based on the information inputted by the user.

In addition, in the case of the transmitter circuit 2 or receiver circuit 3 being able to determine which axis is managed by which transmitter circuit 2 (DSP) according to detection, etc. of a connection of the numerical control 10 to a connector, instead of being inputted as a parameter by the user using an input device, etc., the transmitter circuit 2 may perform writing in the storage unit 324 of the partial-write enable filter circuit 32 within the receiver circuit 3 (control LSI) during machining stop of the machine tool.

In addition, in the case of the transmitter circuit 2 or receiver circuit 3 being able to determine with which transmitter circuit 2 (DSP) managing which axis could perform computation efficiently, the transmitter circuit 2 or receiver circuit 3 can generate partial-write enable information, or notify the axis managed by this transmitter circuit 2 (DSP) to the transmitter circuit 2 (DSP), based on the results of this determination.

Figure 12:
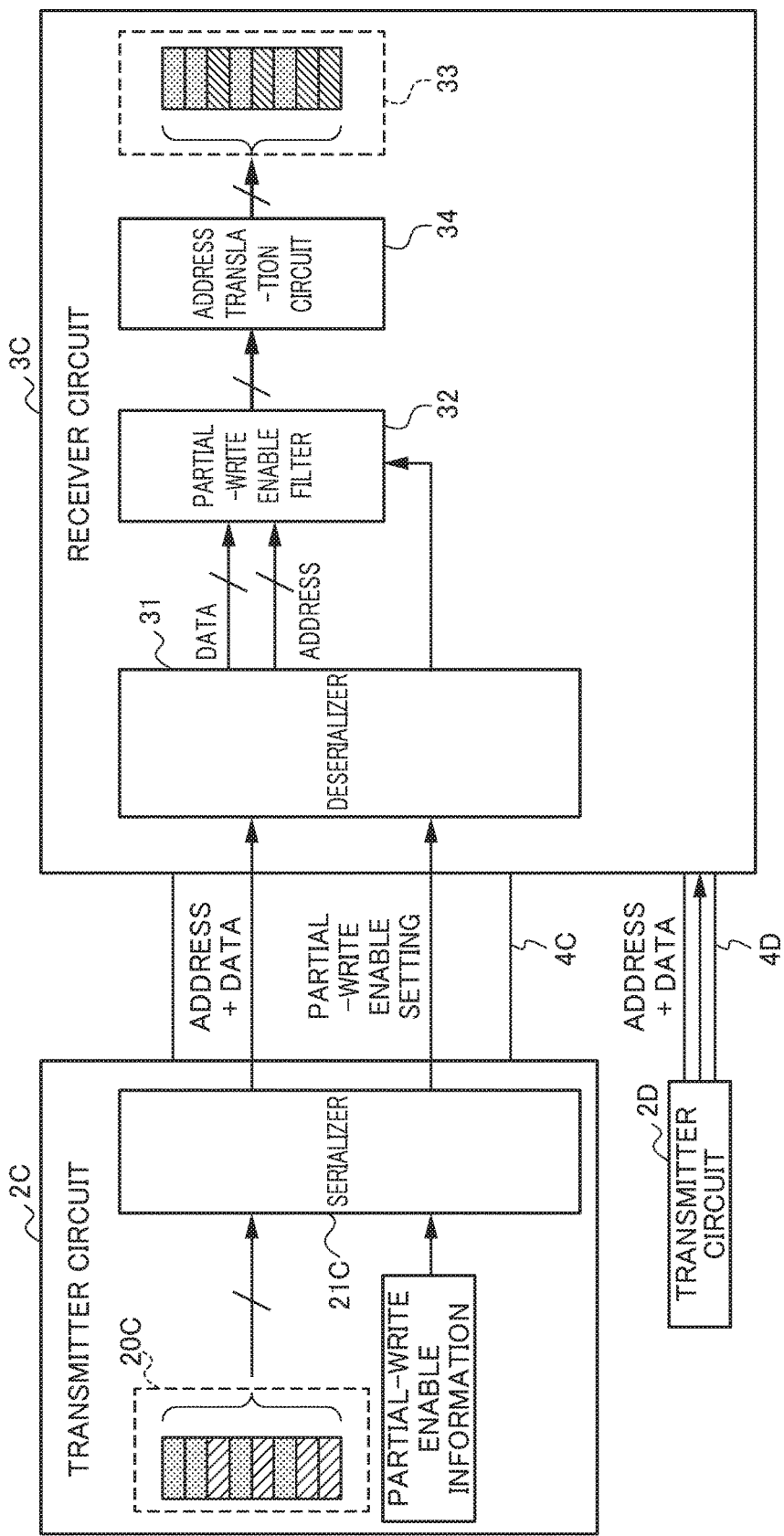
FIG. 12 is a block diagram showing a modified example of the communication circuit 1 shown in FIG. 10.

FIG. 12 is a block diagram showing a modified example of the communication circuit 1 shown in FIG. 10. As shown in FIG. 12, the communication circuit 1 differs from the example shown in FIG. 10, in the point of determining partial-write enable information by the transmitter circuit 2A, and outputting this partial-write enable information to the receiver circuit 3. It should be noted that the partial-write enable information, despite being transmitted on the same communication line as the normal serial data as a type of data, is shown separately for convenience of explanation in FIG. 12.

As shown in FIG. 12, the transmitter circuits 2C and 2D transmit data to the receiver circuit 3C via the serializers 4C and 4D, respectively. The receiver circuit 3C deserializes the data transmitted from the transmitter circuits 2C and 2D by way of the deserializer 31.

The partial-write enable filter circuit 32 permits or inhibits writing for a part or all of the input data deserialized by the deserializer 31.

The address translation circuit 34 converts the addresses of a plurality of different valid data. Then, the address translation circuit 34 stores the plurality of valid data for which the address was converted at the same address within the storage region 33 of the receiver circuit 3.

The communication circuit 1 shown in FIG. 12 may determine the partial-write enable information on the side of the transmitter circuit 2C, and output this partial-write enable information to the receiver circuit 3C in this way.

Figure 13:
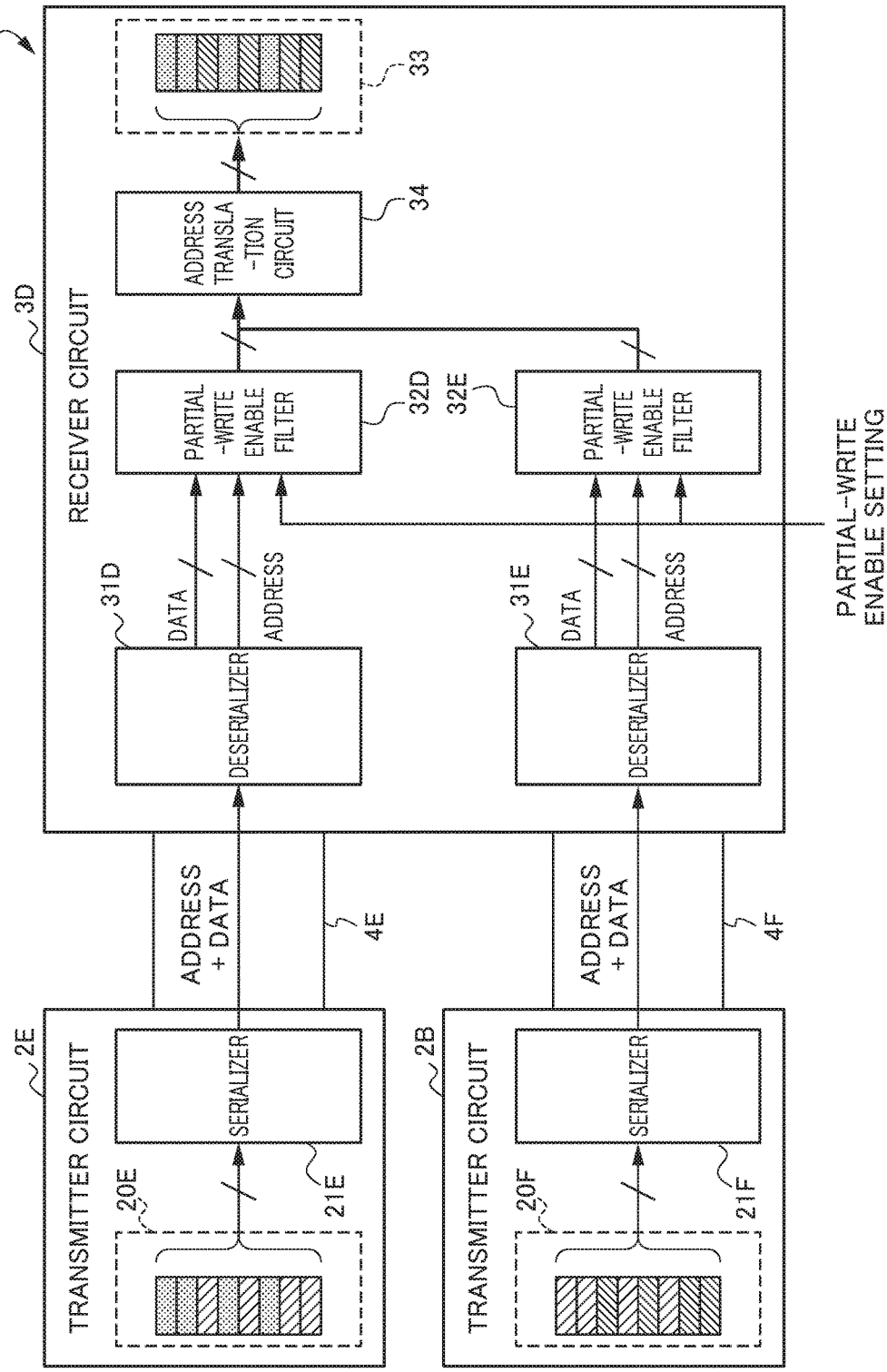
FIG. 13 is a block diagram showing a modified example of the communication circuit 1 shown in FIG. 10.

FIG. 13 is a block diagram showing a modified example of the communication circuit 1 shown in FIG. 10. As shown in FIG. 13, the transmitter circuits 2E and 2F transmit data to the receiver circuit 3D, via the serializers 4E and 4F, respectively. The receiver circuit 3D deserializes the data transmitted from the transmitter circuits 2E and 2F by way of the deserializers 31D and 31E.

Then, the partial-write enable filter circuits 32D and 32E permit or inhibit writing for a part or all of the input data deserialized by the deserializers 31D and 31E, respectively.

The address translation circuit 34 converts the addresses of a plurality of different valid data. Then, the address translation circuit 34 stores the plurality of valid data for which the addresses were converted at the same address within the storage region 33 of the receiver circuit 3.

The communication circuit 1 shown in FIG. 13 may select the partial-write enable information by including the partial-write enable filter circuits 32D and 32E in this way.

Although embodiments of the present invention have been explained above, the present invention is not to be limited to the aforementioned embodiments. In addition, the effects described in the present embodiments are merely listing the most preferred effects produced from the present invention, and the effects according to the present invention are not to be limited to those described in the present embodiments.

EXPLANATION OF REFERENCE NUMERALS 1 communication circuit
2 transmitter circuit
3 receiver circuit
4 serial bus
10 numerical control
31 deserializer
32 partial-write enable filter circuit
33 storage region
34 address translation circuit
321 data input unit
322 determination unit
323 enable information acquisition unit
324 storage unit
325 computation unit
326 data output unit
327 selection unit

What is claimed is:
1. A partial-write enable filter circuit that permits or inhibits writing for a part or all of input data in a receiver circuit performing serial communication with a transmitter circuit, comprising:
  a data input unit that accepts the input data;
  a determination unit that determines whether partial write of the input data inputted at the data input unit is valid;
  an enable information acquisition unit that acquires partial-write enable information indicating a valid portion of the input data inputted at the data input unit;
  a storage unit that stores the partial-write enable information acquired by the enable information acquisition unit;

a computation unit that computes valid data in the input data, based on the partial-write enable information stored in the storage unit and corresponding to the input data, and the input data inputted at the data input unit, in a case of the determination unit determining that partial write of the input data is valid; and a data output unit that outputs the valid data computed by the computation unit.

2. The filter circuit according to claim 1, wherein the storage unit stores a plurality of sets of the partial write enable information, wherein the partial-write enable filter circuit further comprises a selection unit that selects one set of the partial-write enable information from the plurality of sets of the partial-write enable information stored in the storage unit, based on the input data inputted at the data input unit, and wherein the computation unit computes the valid data based on the input data inputted at the data input unit and the set of the partial-write enable information selected by the selection unit.

3. The filter circuit according to claim 2, wherein the selection unit selects one set of the partial-write enable information from the plurality of sets of the partial-write enable data stored in the storage unit, based on an input address indicating an address at which data is written in the input data.

4. A communication circuit comprising:

a transmitter circuit that transmits, to a receiver circuit, input data including transfer destination address information which differs for every set of input data; and the receiver circuit including the filter circuit according to claim 2, and an address translation unit that converts an address for writing the valid data in a storage region of the receiver circuit, wherein the selection unit of the filter circuit selects one set of the partial-write enable information from among a plurality of sets of the partial-write enable information stored in the storage unit, based on the transfer destination address information of the input data inputted at the data input unit, and wherein the address translation unit converts the address of the valid data and stores the valid data at the same address in the storage region of the receiver circuit.

5. A numerical control comprising the communication circuit according to claim 4.

* * * * *